S. C. MAINE.
Assignor to THE NEW ENGLAND WARDROBE BEDSTEAD CO.
Cabinet-Bedstead.
No. 8,270. Reissued June 4, 1878.
Fig. 1.
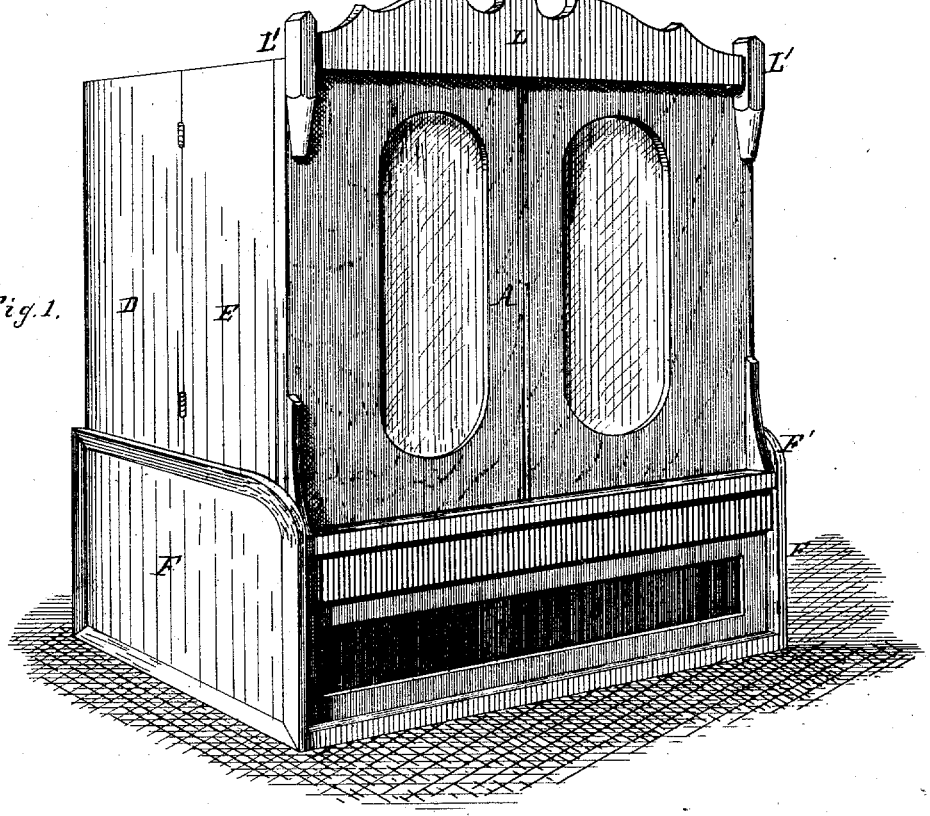
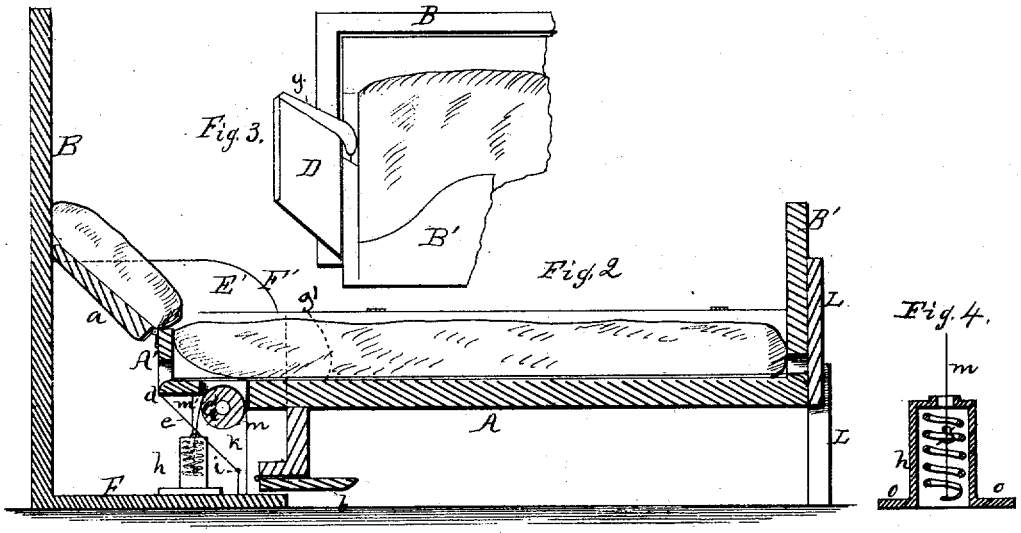
Witnesses.
C. H. Latimer.
J. N. Johnson.
Inventor.
S. C. Maine
by J. H. Adams Atty.
N. PETERS, PHOTO-LITHOGRAPHER, WASHINGTON, D. C.

2 Sheets—Sheet 2.

S. C. MAINE.

Assignor to THE NEW ENGLAND WARDROBE BEDSTEAD CO.

Cabinet-Bedstead.

No. 8,270. Reissued June 4, 1878.

Witnesses:
C. H. Searle.
W. A. Wood.

S. C. Maine,
Inventor:
By North & Osgood,
Atty's. Attorney.

N. PETERS, PHOTO-LITHOGRAPHER, WASHINGTON, D. C.

UNITED STATES PATENT OFFICE.

SEBEUS C. MAINE, OF BOSTON, MASSACHUSETTS, ASSIGNOR TO THE NEW ENGLAND WARDROBE BEDSTEAD COMPANY.

IMPROVEMENT IN CABINET-BEDSTEADS.

Specification forming part of Letters Patent No. 91,244, dated June 15, 1869; Reissue No. 8,270, dated June 4, 1878; application filed October 11, 1877.

*To all whom it may concern:*

Be it known that I, SEBEUS C. MAINE, of Boston, in the county of Suffolk and State of Massachusetts, have invented an Improved Cabinet-Bedstead, of which the following is a full, clear, and exact description, reference being had to the accompanying drawings, in which—

Figure 5:
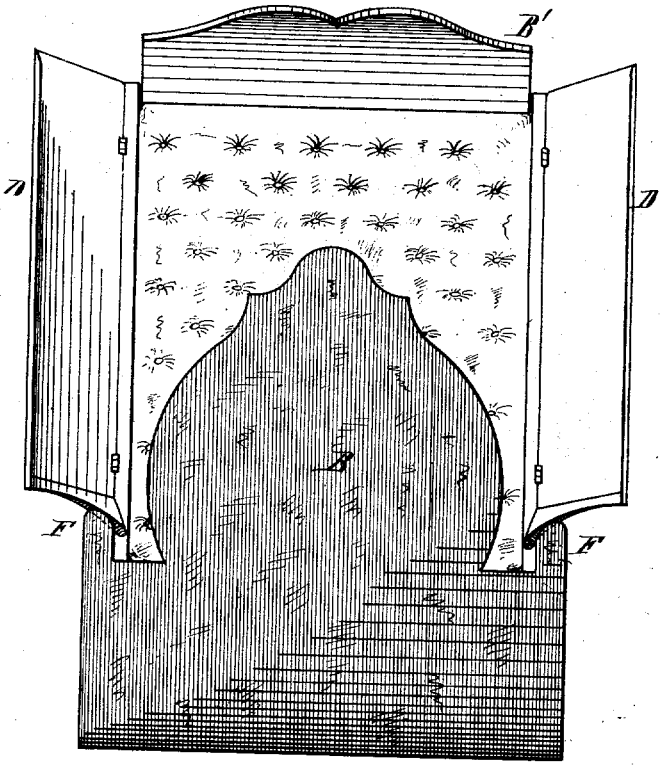
Figure 6:
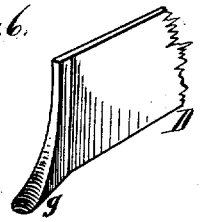

Figure 1 is a perspective view of my improved bedstead when folded. Fig. 2 is a longitudinal section of the bedstead when ready for use. Fig. 3 is a sectional plan view of wing or sides being folded. Fig. 4 is a longitudinal section of a counterbalancing device employed for the purpose of facilitating the movement of the bed from an opened to a closed position, or the reverse. Fig. 5 is a rear view of the bedstead as it appears when the bed is partially closed; and Fig. 6 is a perspective view of a fragment of the end of one of the folding leaves, showing the cam surface or projection attached thereto.

My invention has relation chiefly to that class of folding bedsteads wherein no appearance of an upright case remains when the bed is opened, and in which, when the bed is closed, the structure presents the appearance of a book-case, secretary, or other piece of furniture, the effect of the said invention being to simplify and improve upon previous constructions, rendering the improved device more easy to be operated and automatic as to its several movements—that is to say, so that it may be easily and completely opened or closed by one movement of the hand.

To accomplish all of this, the invention consists in certain peculiarities of construction or arrangements or combinations of parts, as will be hereinafter first fully described, and then pointed out in the claims.

In the drawings, A is the front of the case, and constitutes the bottom of the bedstead. B is the head-board, and B′ an inner foot-board, of the bedstead. F F are the sides of the casing, containing supports for the shaft or roller, together with the spring for counterbalancing the bedstead. The edges of the sides F F are rounded, as shown at F′ F′.

D is a wing attached by hinges to the side F of the bedstead, and controlled as to position by the rounded edges thereof.

The bed-bottom A is, of course, made movable about some horizontal line or axis, and the roller or shaft G, supported in suitable bearings *k*, furnishes the required axis.

It is important that the bed-frame should be counterbalanced, in order to overcome a considerable portion of the weight in closing the bedstead, and in order to prevent the bed-frame from descending too rapidly when being lowered. To accomplish this, I have chosen the coiled springs S, as in Fig. 4, contained in a casing, *h*, which is fastened to the bottom of the case or box F by a lip, *o*.

A strap, chain, or cord, *m*, is attached to the lower part of the spring S, and extends up through the spring and the top of the case *h*, and then winds around the shaft G, as shown in Fig. 2; or the strap, &c., may be attached to the bedstead-frame at any convenient part; or the spring and shaft may be used as shown and described in the patent granted to me March 19, 1867. The spring is shown in its contracted condition. When it is desired to raise the bedstead to its upright position, a slight pressure at the foot of the same will serve to elevate it, the action of the spring serving to draw the bedstead up, and also serving as a counterbalance in lowering the same.

In order to adapt the bedstead to ease of action under different weights of clothing, I make my counterbalance adjustable. This is done by the use of the strap, cord, or chain connection between the spring and shaft, whereby any adjustment of the said connection can be given to increase or diminish the tension of the spring.

*a* is a shelf, hinged to a cross-piece of frame A near the head of the bedstead. This shelf serves to hold the pillows when the bedstead is extended, and to close the space between the bedstead-frame and head-board when the bedstead is folded. The shelf *a* and lid *b* act automatically as the bedstead is folded up or let down. At the top of the front of the cabinet or piece of furniture, constituting the casing when closed, is a finish or ornamentation, L L, as shown in Fig. 1.

The part L is hinged or pivoted to the upper part or foot end of the cabinet, and when the movable bed-frame is perpendicular it stands parallel or substantially in line therewith, forming a pediment or ornament raised above and concealing the hinges, and when the bedstead is lowered the part L still retains its vertical position, as shown in Fig. 2, lapping over the interior foot-board B′, and forming an ornamental exterior foot-piece to the bedstead.

To the part or pediment L, at each end thereof, are attached parts L′ L′, which, when the bedstead or frame is up, form brackets or capitals for the pediment, and when it is down are brought into position to serve as supports or legs to the bedstead. The action of the parts L and L′ is automatic, following the movement of the bedstead from horizontal to perpendicular, or vice versa. In this instance I have shown it as induced by means of a strap, *e*, extending from the lower side of L to a point, *i*, in the bottom of the casing F. The wings D D have scarfed ends *g*, which work against the rounded edges of the side pieces F of the base-frame. As the bedstead is elevated the contact of these edges gives to the wings a winding motion, causing them to reach a closed position as the bedstead comes to the perpendicular, and as it falls the same means cause the wings to be gradually and easily let down to the sides of the bed-frame. The bedstead, when closed or turned up, has the appearance of a book-case, secretary, or kindred piece of furniture, to be finished in any shape or design which may be desired.

When the bedstead is to be extended the front portion or movable frame A is drawn down from the top, the wings D fall into position by the sides of the frame, the shelf *a* rises and assumes the position shown in Fig. 2, and the pediments and supports come into position to cover and sustain the foot end of the frame. In turning up, a light lift under the foot end will, with the action of the spring, carry the movable frame to its upright position, the other parts or attachments automatically returning to their position in the cabinet structure, the lid *b* falling into place, and shelf *a* taking its proper position to hold the pillows and bed-clothing from falling to the commode-space at the bottom of the cabinet.

Ease of action in extending and rising is a great desideratum in cabinet-beds, which I have obtained by the adjustment of the cord, or chain, or other connection between the spring and shaft G, so that the bed may be balanced to any weight of clothing it may have to carry. The peculiar construction of the spring and case shown in Fig. 4 enables me to secure this nice adjustment. No cumbrous case is left when the bed is extended, but only a neat French bedstead is seen.

Having thus described my invention, what I claim as new, and desire to secure by Letters Patent is—

1. The combination of the wings D, hinged to the side boards of the movable bed, and arms F of the base with suitable means for automatically closing the wings as the bed is raised, substantially as described.

2. The combination of an inclosed coiled spring, S, strap or cord *m*, and shaft or roller G with the movable bed-frame and stationary base-frame, substantially as described.

3. In a cabinet-bedstead, the combination, with the movable bed-frame, of permanent counter-balance adjustable in stress to compensate for variations in weight of bed-clothing, substantially as described.

4. The combination of the spring S, attached to the base-frame, and shaft or roller G upon the movable bed-frame with the adjustable intermediate connection *m*, substantially as described.

5. The combination of the automatically-operating shelf *a* and door *b* with the bed-frame, substantially as described.

6. The combination, with the movable frame of a cabinet-bedstead, of a relatively-moving impediment automatically raised into position as the frame is made to assume the perpendicular, substantially as described.

7. The combination, with the movable bed-frame of a cabinet-bedstead, of a folding pediment and legs attached to said pediment, which are automatically brought into position to form either the foot-board or the pediment of the case as the frame is lowered or raised.

8. The combination, with the folding pediment and legs of a cabinet-bedstead, of suitable mechanism for automatically determining their movement as the bed-frame is lowered, substantially as described.

9. The combination, with pediment L, of cord *e*, bed-frame A, and base-frame F, substantially as described.

10. In a cabinet-bedstead, a folding frame, hinged at the extreme end of the longitudinal bars of the movable bed-frame, and adapted to assume a position at right angles thereto when it is down to form a support and exterior foot-piece, and parallel therewith when it is up, projecting above and concealing the hinges, and forming an ornamental top piece or pediment to the case, substantially as described.

11. The cabinet-bedstead herein described, consisting, essentially, of base-frame F, movable bed-frame A, with counterbalancing device, and the automatically-folding pediment and legs, substantially as described.

In testimony whereof I have signed my name to this specification in the presence of two subscribing witnesses.

S. C. MAINE.

Witnesses:
J. H. ADAMS,
L. H. LATIMER.